(12) United States Patent
Poupet et al.

(10) Patent No.: US 11,023,180 B2
(45) Date of Patent: Jun. 1, 2021

(54) METHOD, EQUIPMENT AND SYSTEM FOR MANAGING THE FILE SYSTEM

(71) Applicant: MOORE, Paris (FR)

(72) Inventors: Paul Poupet, Paris (FR); Benjamin Poilve, Paris (FR); Robin Lambertz, Medan (FR); Pierre Peltier, Paris (FR)

(73) Assignee: MOORE, Paris (FR)

( * ) Notice: Subject to any disclaimer, the term of this patent is extended or adjusted under 35 U.S.C. 154(b) by 0 days.

(21) Appl. No.: 16/488,373

(22) PCT Filed: Jan. 12, 2018

(86) PCT No.: PCT/FR2018/050070
§ 371 (c)(1),
(2) Date: Aug. 23, 2019

(87) PCT Pub. No.: WO2018/154197
PCT Pub. Date: Aug. 30, 2018

(65) Prior Publication Data
US 2020/0249844 A1    Aug. 6, 2020

(30) Foreign Application Priority Data
Feb. 24, 2017  (FR) ...................................... 17/51471

(51) Int. Cl.
*G06F 3/06* (2006.01)

(52) U.S. Cl.
CPC ............ *G06F 3/067* (2013.01); *G06F 3/0611* (2013.01); *G06F 3/0643* (2013.01); *G06F 3/0647* (2013.01); *G06F 3/0685* (2013.01)

(58) Field of Classification Search
CPC ...... G06F 3/067; G06F 3/0611; G06F 3/0643; G06F 3/0647; G06F 3/0685
See application file for complete search history.

(56) References Cited

U.S. PATENT DOCUMENTS

| | | | |
|---|---|---|---|
| 5,305,389 A | 4/1994 | Palmer | |
| 9,223,795 B2 | 12/2015 | Guo et al. | |
| 9,323,695 B2 | 4/2016 | Frachtenberg | |
| 2003/0061451 A1* | 3/2003 | Beyda ................ | G06F 16/9574 711/137 |
| 2005/0160096 A1* | 7/2005 | Lin ..................... | G06F 16/9574 |
| 2008/0086600 A1* | 4/2008 | Qiao ................... | G06F 12/0862 711/133 |

(Continued)

*Primary Examiner* — Tonia L Dollinger
*Assistant Examiner* — Jihad K Boustany
(74) *Attorney, Agent, or Firm* — Bachman & LaPointe, P.C.

(57) ABSTRACT

A method for managing the file system of a computer terminal having a local memory, connected to a network comprising at least one remote storage device, comprising steps for periodically calculating the local or remote addressing of a digital file to be recorded, read or modified based on a periodically recalculated law, wherein said step of calculating the addressing is based on metadata present in said digital file to be processed, the access history of said file to be processed and the local tree structure of the files, said law is determined from a reference law, recalculated in the background, by processes based on a user's usage, to control the copying of a remote file to the local memory before access to said file is requested, and to erase local files for which the said law determines a usage indicator below a threshold value.

10 Claims, 5 Drawing Sheets

(56) References Cited

U.S. PATENT DOCUMENTS

| | | |
|---|---|---|
| 2011/0296111 A1 | 12/2011 | di Bona et al. |
| 2014/0095789 A1 | 4/2014 | Chambliss et al. |
| 2014/0108335 A1* | 4/2014 | Chan .................. G06F 16/20 707/610 |
| 2015/0278168 A1* | 10/2015 | Hawa .................. G06F 40/197 715/205 |
| 2016/0321291 A1 | 11/2016 | Malhotra et al. |
| 2017/0171114 A1* | 6/2017 | Dao .................. H04L 67/2842 |

* cited by examiner

Fig. 3

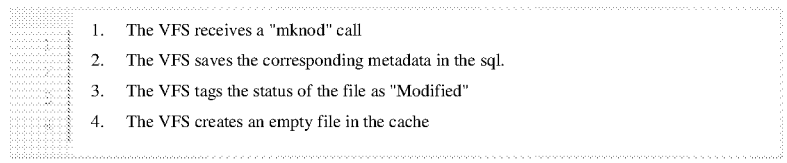

1. The VFS receives a "mknod" call
2. The VFS saves the corresponding metadata in the sql.
3. The VFS tags the status of the file as "Modified"
4. The VFS creates an empty file in the cache

Fig. 4

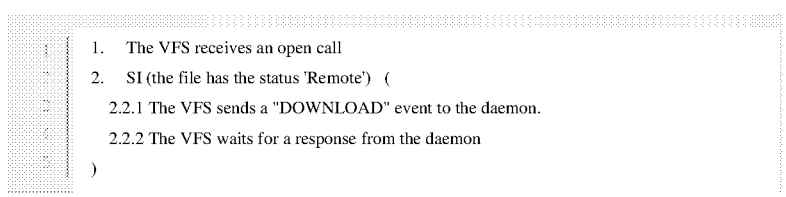

1. The VFS receives an open call
2. SI (the file has the status 'Remote')  (
   2.2.1 The VFS sends a "DOWNLOAD" event to the daemon.
   2.2.2 The VFS waits for a response from the daemon
)

Fig. 5

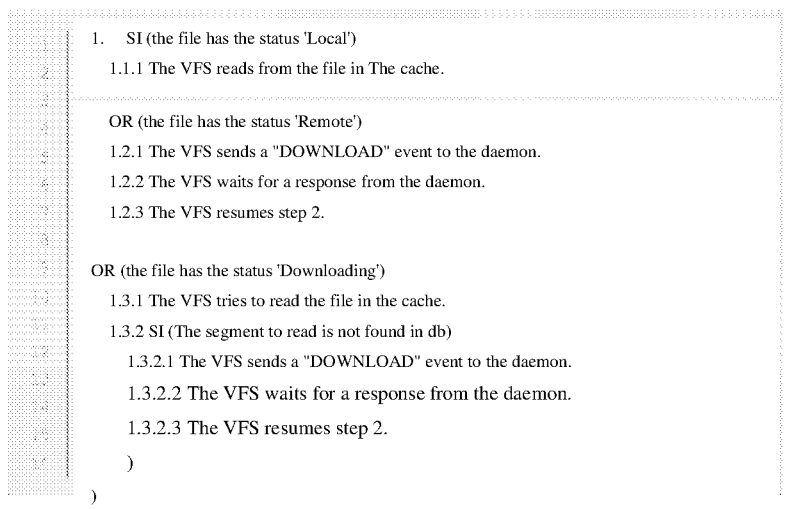

1. SI (the file has the status 'Local')
   1.1.1 The VFS reads from the file in The cache.

OR (the file has the status 'Remote')
   1.2.1 The VFS sends a "DOWNLOAD" event to the daemon.
   1.2.2 The VFS waits for a response from the daemon.
   1.2.3 The VFS resumes step 2.

OR (the file has the status 'Downloading')
   1.3.1 The VFS tries to read the file in the cache.
   1.3.2 SI (The segment to read is not found in db)
      1.3.2.1 The VFS sends a "DOWNLOAD" event to the daemon.
      1.3.2.2 The VFS waits for a response from the daemon.
      1.3.2.3 The VFS resumes step 2.
      )
)

METHOD, EQUIPMENT AND SYSTEM FOR MANAGING THE FILE SYSTEM

BACKGROUND

This invention relates to the field of hybrid data storage using a limited capacity local storage resource with low data access time, and a remote resource with higher capacity but a longer access time, for example a cloud resource or a resource on a remote server which the client equipment is connected to by a computer network or a connected storage device.

The main equipment, such as a computer, tablet or smartphone, is equipped with storage resources such as one or more flash memory/ies or hard disks.

Local storage capacities are used to store files that the user wants to be able to access for reading or editing, as well as temporary files, such as cache files that avoid the need to repeatedly transfer remote files, or transient work files.

When the local memory is full, some applications may experience serious malfunctions leading to the permanent loss of work data.

It is therefore common for the file management system of a computer equipment to manage the distribution of local and remote storage resources in order to optimize the operation of applications running on computer equipment.

It is then necessary to provide a process for allocating the different storage resources and accessing data recorded on different resources, often in a way that is transparent to the user.

For example, the "FUSION DRIVE" solution (APPLE's trademark) controls the distribution of data between a 128Go SSD resource and a hard disk having a capacity which may exceed 1 terabyte. The management of these two resources consists in saving by default the applications on the SSD memory as well as the temporary files corresponding to these applications, to reserve a free space of a few gigabytes on the SSD memory for the recording of cache files. When the cache is full, it "overflows" onto the hard disk, the operating system controlling the recording no longer on the SSD memory but on the hard disk of larger capacity but slower.

In addition, the operating system decides on the movement of certain files and data and applications from the hard disk to the SSD memory and vice versa, anticipating that the most frequently used data will be found on the SSD and the least frequently used data will remain on the hard disk. However, the original file is not erased until the copy from one resource to another is completed, for security reasons. Once this operation is performed, the original file is erased.

However, these solutions appear relatively simplistic and do not allow optimal management of the allocation of storage resources and do not allow the management of remote resources.

State of the Art

It has been proposed in the state of the art to improve these principles for an optimized management of remote "cloud" resources.

For example, patent U.S. Pat. No. 9,223,795 describes a solution including an interface with at least one user application for a transparent view by a file management system module and a user storage client module implemented in a user-level file system, to access and synchronize at least one resource stored in a storage media device.

This method involves processing a request from the user's application to access the file system resource through a series of processes:

a request to access the transparent view includes a plurality of operations to manipulate the resources stored in the storage media devices;

the storage client module receives a request for access to the resource from the user's application for the transparent view;

the retrieval, by a storage prediction service, of the request for access to the resource, wherein the request further includes metadata associated with the user's application request, the retrieval further includes the processing of metadata associated with the request used to identify the resource stored in the storage medium device;

identification of an additional request to access an additional resource stored in an additional storage medium device;

the receipt, by a network storage service, of the request for access to the resource, including metadata associated with the request of the storage prediction service used to mount the recording medium device;

providing access to the user application, a transparent view including access to additional resources stored in the additional multimedia devices stored.

Another example of a known solution is described in U.S. Pat. No. 9,323,695 patent for a predictive cache replacement method to determine which data should be erased from an access cache memory from a dynamically constructed data tree.

Another solution is described in patent U.S. Pat. No. 5,305,389 for a cache memory subsystem managed from predictions based on access models stored by a context. An access model is generated from previous accesses to a processing of the data processing system in a similar context.

During a learning sequence, a memory access trace is processed to determine future predictions.

Also known is the US patent application US2011/21296111 describing a system and process for an interface to access and manipulate data to allow access to data on a storage module on a network-based system. The data is presented as a virtual disk for the local system via a hardware interface that emulates a disk interface. The system and method incorporate features to improve the recovery and storage performance of frequently accessed data such as partition information, operating system files or file system information by using cache and difference calculations. This system and method can be used to replace some or all of the fixed storage in a device. The system and method can provide on-line and off-line access to the data.

Drawbacks of the Prior Art

Prior art solutions generally take into account current processing to determine the path when requesting access to a data or file stored in the memory, but do not anticipate such a need for access to a data or file to allow the allocation between different storage resources to be redefined so as to ensure the availability of files on local fast memory at the time an application needs to read or modify it.

This results in long access times when the data or file is not available locally, high bandwidth consumption and sometimes a major malfunction, when the network is not available to ensure the transfer of a data or file needed to continue running an application.

The solution proposed by the US application US 2011/21296111 is also the implementation of a data access system allowing access to a file in the absence of a network without increasing the available memory.

Also known is the solution described in the US patent application US 2016/321291 describing a method of accessing a file system in a cloud storage platform storing shared content accessible over a network by two or more user devices, including:

the implementation of a file system interface between a cloud storage platform and a virtual file system, wherein the file system interface directs file system calls from an application running on one of the user's devices to the virtual file system;

processing at least some of the file system calls received at the file system interface via a first operation pipeline including a local data manager that sends one or more of the file system calls to a file system executor performing local processing events; receiving a file event from the first pipeline and initiating processing of the file event by a second pipeline including at least a first operation to access local metadata corresponding to the file events and a second operation to access a local cache to identify a portion of a file in the virtual file system; and providing at least one identification of the local cache content to a remote storage application programming interface to initiate a change in the file system of the cloud-based storage platform.

The solution described in the US patent application US 2014/095789 for a computer system for data management is still known. One aspect includes a method of assigning storage types to data based on the frequency of access.

SUMMARY

To remedy these disadvantages, the invention, in its broadest sense, relates to a method for managing the file system of a computer terminal having a local memory, connected to a network comprising at least one remote storage device, comprising the steps of periodically calculating the local or remote addressing of a digital file to be recorded, read or modified according to a law recalculated periodically, characterized in that said step of calculating the addressing is based on metadata present in said digital file to be processed, the access history of said file to be processed and the local tree structure of the files, said law is determined from a reference law, recalculated in the background, by processing according to the user's usage, to control the copying of a remote file into the local memory before the access to said file is requested, and to delete the local files for which said law determines a usage indicator below a threshold value, said control law being determined to minimize the volume of data transferred between the local and the remote memory and to minimize the local cache failure, and in that said method includes steps performed in the background to copy local recorded files into the remote storage equipment, and in that the controls for modifying a remote file cause the part of said file to be modified to be downloaded into the local memory, the part of the file to be modified to the local memory to be unlocked, the part of the file to be modified to be locally modified, the part of the file to be modified to be locked and the part of the file to be resynchronized to the local file to be resynchronized.

Advantageously, said control law according to the user's usage takes into account a criterion relating to the accessibility of said file off-line.

Preferably, the tree structure of local and remote files and the indexing table of all local and remote files are stored in the local memory and in that the operating system includes transparent means of viewing the tree structure.

According to an alternative solution, the method includes pre-processing in the background of the log file to group the log information according to a proximity criterion (vector embedding).

According to another alternative solution, the method includes pre-processing in the background to group files on the same storage space according to a vector distance indicator between said files.

Advantageously, said pre-processing operations are carried out at the time of logging, training of a neural network on these logs, and from a pre-trained network to calculate a digital indicator corresponding to the probability of future use for each of the files.

According to an alternative solution, the addressing of a file is determined by applying a combinatorial optimization algorithm applied to said digital indicator of probability of use and the characteristics of local memory and network communication.

The invention also relates to computer equipment comprising a processor and one or more local memory/ies, for example a flash memory or a hard disk, associated with a network circuit 13, as well as a memory for recording a code controlling the management of the file system according to the above-mentioned method.

The invention also relates to a system consisting of at least one server and at least one computer equipment comprising a processor and one or more local memories, for example a flash memory or a hard disk, associated with a network circuit 13, as well as a memory for recording a code controlling the management of the file system according to the above-mentioned method.

BRIEF DESCRIPTION OF THE DRAWINGS

The present invention will be best understood when reading the following description thereof, which relates to a non-restrictive exemplary embodiment, while referring to the appended drawings, wherein:

FIGS. 3 to 11 present examples of processing processes.

DETAILED DESCRIPTION

Figure 1:
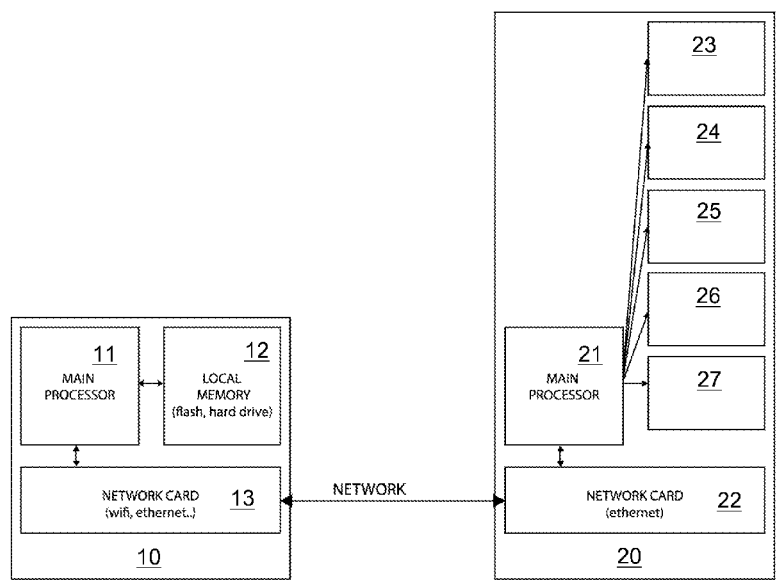
FIG. 1 is a schematic view of the hardware architecture of one infrastructure according to the invention.

The invention relates to a mixed (cloud/physical) storage system for the user.

The aim is to provide a complete solution for storing and keeping accessible a large amount of data that exceeds the physical storage capacity of the computer equipment used, such as a cell phone ("smartphone") or a Flash drive.

The invention is based on the following principles:

file system virtualization to manage files in a transparent way the use of the network connection (e.g. Internet) of local computer equipment for the remote storage analysis of the user's habits and applications running on local computer equipment to determine a priority for the file to be stored locally the use of local storage as an acceleration cache for a speed equivalent to a traditional file management system the preservation of metadata of all associated files to emulate their presence both when the computer equipment is connected to the Internet and when access to the network is impossible. This metadata may include versions of the file in reduced quality ("thumbnail") or compressed to allow minimal use of the file.

optimization of transfers to reduce bandwidth costs.

From the user's point of view, the storage capacity is infinite. If the computer equipment is connected to the Internet, all documents are accessible. If the computer equipment is not connected to the Internet, only documents identified as important are accessible, the others cannot be opened, or are available in reduced quality, or compressed.

When the computer equipment is not connected to the Internet, any document additions are managed locally.

If there is enough space left on the clean storage space, the document is simply added and joggled for later synchronization.

Otherwise, the local storage space is freed up by deleting the documents less frequently used by the user and the new documents are added and joggled for later synchronization. The user can also joggle his/her own documents. He/she can thus force documents to remain on the local storage resource, if he/she knows he/she will need them. Data transfers between computer equipment and the cloud are encrypted and storage in the cloud is encrypted and can be locked with a password.

Emulation of the File Management System

Mixed storage is implemented using software running on the host computer that emulates a file system. To do this, the generic FUSE driver is used.

The file system consists of three components:

1. A metacache consisting of a file in the physical storage of computer equipment, which contains the metadata related to each file. The metacache is implemented in SQL database.

2. An access to a cloud or remote storage resource in which all files in the file system are stored.

3. A local cache in the physical storage of the key, where the files that the user is most likely to want to use in the near future are stored.

When the computer equipment is on-line, all the files in the file system are accessible. If the file is in the local cache, it is accessed first to improve performance.

When the computer equipment is off-line, only the files in the local cache are available.

Hardware Architecture of a System According to the Invention

Figure 2:
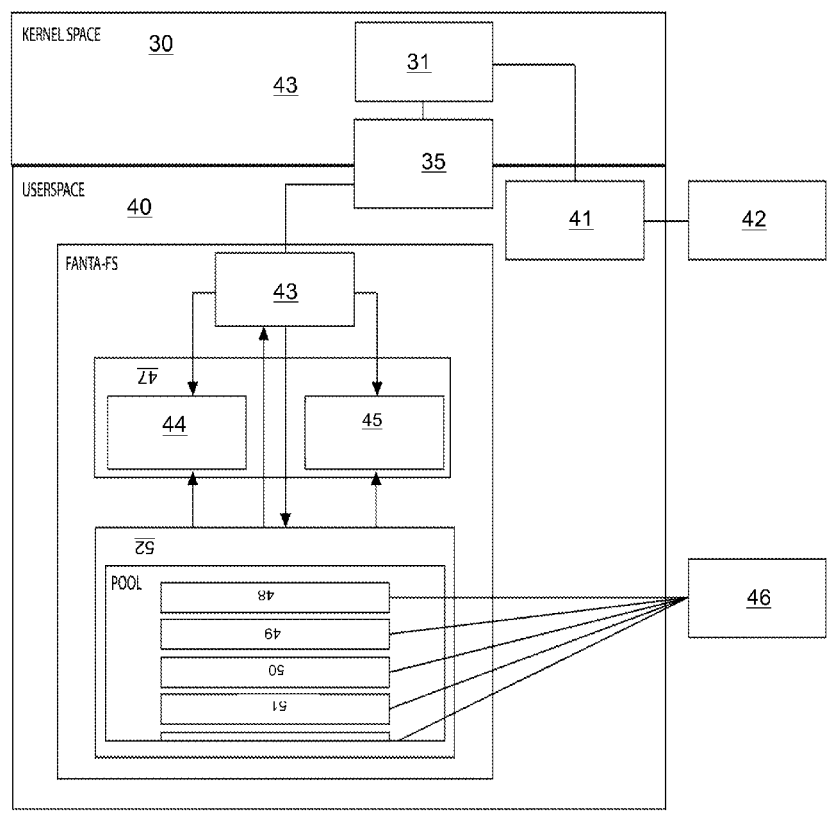
FIG. 2 is a schematic view of the functional architecture of a system according to the invention.
Figure 6:
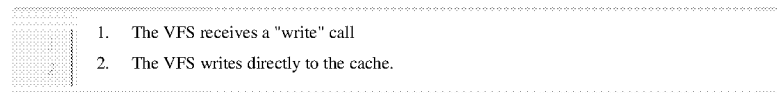

FIG. 1 shows a schematic view of the hardware architecture of the system;

FIG. 2 shows a schematic view of the functional architecture of the system;

FIGS. 3 to 11 present examples of processing processes (threads)

Description of the System Hardware Architecture

It consists of computer equipment 10, for example a tablet, a computer, connected via a network, for example the Internet, to a server 20.

The computer equipment 10 comprises a processor 11 and one or more local memory/ies 12, for example a flash memory or a hard disk, associated with a network circuit 13, for example a WIFI or Ethernet network card.

The server 20 also includes a processor 21 and one or more local memory/ies 23 to 27, for example a flash memory or a hard disk, associated with a network circuit 22, for example a WIFI or Ethernet network card.

Data Processing Algorithm

The purpose of this section is to explain the data processing carried out to best serve the user's use. These treatments have two purposes:

Determine the reasons for using files to be able to predict with the highest accuracy the files to be stored on the local cache (in the context of off-line use, but also to accelerate system responsiveness)

To determine "groups" of files in order to offer the user file classifications adapted to his/her use, but also to pre-fetch files to improve performance.

These processing operations must be carried out with a certain number of constraints linked to the specific application, namely:

The need to process data continuously (stream)

Limiting the amount of data stored for each file

A space in continuous change (adding/removing files . . . )

The limitation of computing power related to this process

This process is based on deep learning algorithms, based on a pre-trained model that will adapt to the specific uses of the user to provide an optimal experience.

This algorithm is based on the notion of clustering, using metadata to create meaningful use groups, but also on the idea of supervised learning in which the algorithm constantly learns from recent events.

The classification uses both linear regression methods/ "classical" classification (KNN, SVM, Markov process) and recurrent neural networks combined with vector embedding to achieve optimal selection.

Implementation of the Invention

The user will use his/her computer equipment in a transparent way.

FIG. 2 shows a schematic view of the functional architecture of the invention;

As is known, the processor of a computer equipment has at least two operating modes, including a so-called supervisor mode or kernel mode 30 which does not impose restrictions on the instructions executed, and a so-called user mode 40 which limits what instructions can do, and when the operating system 31 implements this distinction by operating the other programs in user mode and reserving the supervisor mode for itself, the programs so restricted are said to be part of the user space 40.

The application will typically send to the operating system core 30 ("Kernel") a system call related to file system management ("file system") (for example: read, write, open, make dir . . . ).

In the solution proposed by the invention, the

FUSE/Dokany library 35 is used to "bring" these calls back into the USERSPACE application 40 and therefore use a program 41 to answer them.

USERSPACE 40 or "user space file system" is a space that allows a user 42 without special privileges to access a file system 43 without the need to modify the core sources, via an application commonly referred to as FUSE.

Fuse has the effect of relaying these calls and forwarding responses. A "binding" library is used to communicate with a program written in RUST to execute the computer code intended for the implementation of the invention.

The main program is to take these calls and carry out actions to respond them. For this purpose, it has two memory areas.

a) A cache 44, which makes it possible to store the files in themselves.

b) A "metacache" 45 that stores both the meta-data of the files, their physical links (cloud 46/local storage 47), their synchronization status, their history, their importance note, in the form of a SQLite database.

For each call, the main process will therefore perform an action in these storage areas and then send a response back to FUSE 35. It should be noted that this response may be subject to a "signal" returned by a light processing process ("thread") 48 to 51.

The second part of the program runs in the background 52 (daemon program) to perform a series of asynchronous tasks, either in response to an action by the VFS that can send signals to it via a channel, or periodically. This organization makes it possible to respond to two issues:

a) Avoid being "blocking" against the user interface when performing long tasks (e.g. uploading) by performing these tasks in a light process (thread)

b) Set up a series of periodic tasks. For example, it is in a light process (thread) of the daemon that file notation is done by the algorithm and the automatic deletion/download of predicted files.

It should be noted that this "daemon" program 52 will also be able to modify the cache 44 (for example when downloading) and metacache 45 files (for example to change the synchronization status of a file).

If these execution queues 48 to 52 ("threads") require access to the cloud 46 ("cloud"), an HTTPS connection is set up, whether for upload or download loading tasks. User-specific identifiers are stored by the program, which makes it possible to use HTTPS API routes to send requests to the cloud provider (BackBlaze). These tasks are divided into two threadpools, one for general use and another dedicated to emergency downloads, in the case of "cache miss".

Prediction Algorithm

The prediction algorithm consists of three main technical building blocks.

Pre-Processing

The purpose of the pre-processing steps is to format data so that deep-learning methods can be applied. A certain number of the data are called "continuous" because they evolve in a continuous or pseudo-continuous space, which allows them to be easily interpreted as vectors. This is not the case for data such as file extensions, or file paths. To use such metadata, "vector embedding" methods are developed. The purpose of these methods is to describe these parameters in a continuous vector space. For this purpose, Markof clustering is used in this implementation to represent file distances continuously, and vector embedding is used to create a vector space where file distances can be interpreted.

Analysis

The analysis is based on a deep-learning model implemented in TENSORFLOW, pre-trained on generic sets which, starting from the aggregated file description vector, makes it possible to predict the probability of using a file over a given period of time. This model is continuously re-trained on the user's data.

Post-Processing

The post-processing consists in choosing a set of files that will give maximum satisfaction. This satisfaction is measured according to two metrics. On the one hand, the probability of a cache failure in the coming period, but also the bandwidth consumption (for economic reasons). In practice, this means using a backpack algorithm in which the available space is that of the local disk, the weight is that of the files, and the utility criterion is the score given by the neural model weighted by a factor related to the previous presence of the file (to reduce bandwidth usage).

These methods are executed asynchronously.

FIGS. 3 to 11 show exemplary processing processes (thread):

Creation of a file by a user (FIG. 3)

Opening a file by a user (FIG. 4)—Reading a file by a user (FIG. 5)

Figure 7:
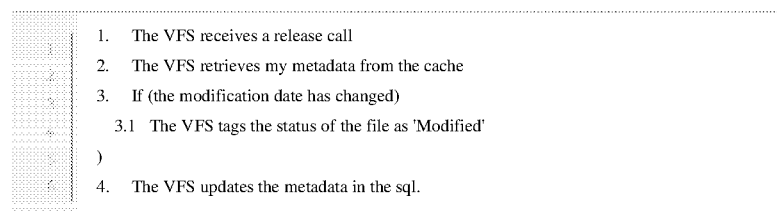

Writing a file by a user (FIG. 6)—Closing a file by a user (FIG. 7)

Figure 8:
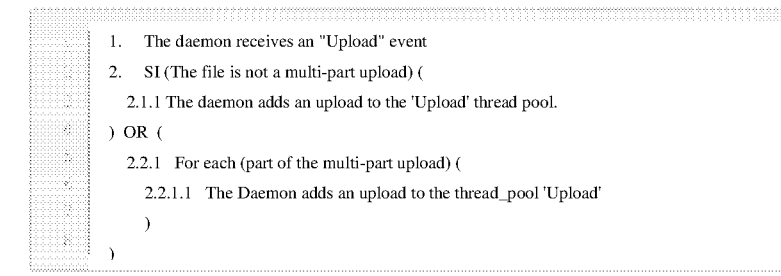

Receipt by the daemon of an upload event" (FIG. 8)

Figure 9:

Receipt by the daemon of a download event" (FIG. 9)

Figure 10:
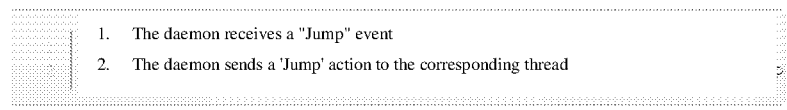

Receipt by the daemon of a Jump event" (FIG. 10)

Figure 11:
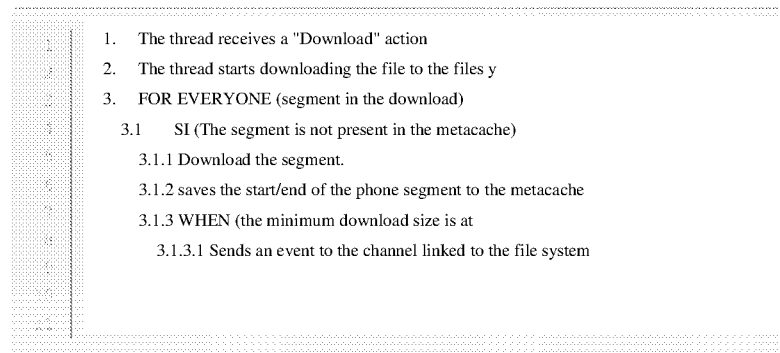

Receipt by the light process set of downloading an event of the "download" type (FIG. 11).

The invention claimed is:

1. A method for managing the file system of a computer terminal having a local memory, connected to a network comprising at least one remote storage device, comprising steps for periodically calculating the local or remote addressing of a digital file to be recorded, read or modified based on a periodically recalculated law, wherein said step of calculating the addressing is based on metadata present in a digital file to be processed, the access history of said file to be processed and the local tree structure of the files, said law is determined from a reference law, recalculated in the background, by processes based on a user's usage, to control the copying of a remote file to the local memory before access to said file is requested, and to erase local files for which the said law determines a usage indicator below a threshold value, determining a control law to minimize the volume of data transferred between the local memory and the remote memory and to minimize the local cache failure, and in that said method includes steps perform in the background to copy local recorded files into the remote storage device, and in that controls for modifying the remote file cause part of said remote file to be modified to be downloaded into the local memory, then unlocking the part of the remote file to be modified, then locally modifying the part of the remote file to be modified, then modifying the part of the remote file to be modified in order to be locked, then locking the part of the remote file and cause said remote file to be resynchronized with a local file.

2. The method for managing the file system of a computer terminal according to claim 1, wherein said control law based on the user's usage takes into account a criterion relating to the accessibility of said file off-line.

3. The method for managing the file system of a computer terminal according to claim 1, wherein the tree structure of the local and remote files and an indexing table of all the local and remote files are stored in the local memory and in that an operating system includes means for transparent display of the tree structure.

4. The method for managing the file system of a computer terminal according to claim 1, wherein the method includes pre-processing in the background of a log file to group log information according to a proximity criterion.

5. The method for managing the file system of a computer terminal according to claim 4, wherein said pre-processing is carried out at a time of logging, training of a neural network on logs, and from a pre-trained network to calculate a digital indicator corresponding to ae probability.

6. The method for managing the file system of a computer terminal according to claim 5, wherein the addressing of a file is determined by applying a combinatorial optimization algorithm applied to said digital indicator of a probability of use and characteristics of a local memory and network communication.

7. Computer equipment comprising a processor and one or more local memory/memories selected from the group consisting of a flash or a hard disk, associated with a network circuit as well as a memory for recording a code controlling the management of the file system according to the method described in claim 1.

8. A system consisting of at least one server and at least one computer equipment comprising a processor and one or more local memory/memories, selected from the group consisting of a flash memory or a hard disk, associated with a network circuit as well as a memory for recording a code controlling the management of the file system according to the method described in claim 1.

9. The method of claim 1 further comprising:
installing a code on a target operating system;
executing said code on said target operating system.

10. The method of claim 9, further comprising:
resizing multimedia files selected from the group consisting of pictures and videos; wherein resized dimensions of the multimedia files are calculated from one of a screen size or a user preference.

* * * * *